United States Patent [19]

Anderson et al.

[11] Patent Number: 5,190,786
[45] Date of Patent: Mar. 2, 1993

[54] FOOD MODIFIER AND PROCESS FOR MAKING SAME LOW FAT CHOCOLATY CHIP WITH HYDRATED MICRO PARTICLES OF COCOA

[75] Inventors: Wendy A. Anderson, New York; Dreena Dulin, Tarrytown; Jimbay Loh, Peekskill; Mark D. Fitch, Stonybrook, all of N.Y.

[73] Assignee: Kraft General Foods, Inc., Northfield, Ill.

[21] Appl. No.: 839,527

[22] Filed: Feb. 20, 1992

[51] Int. Cl.$^5$ .......................... A23G 1/00; A23G 1/04
[52] U.S. Cl. .................................... 426/631; 426/653; 426/660; 426/804; 426/650
[58] Field of Search ............... 426/631, 660, 654, 653, 426/584, 659, 804, 650

[56] References Cited

U.S. PATENT DOCUMENTS 4,713,256 12/1987 Chaveron et al. ................. 426/631
4,810,516  3/1989 Kong-Chan ......................... 426/660
5,009,900  4/1991 Levine et al. ....................... 426/650
5,080,923  1/1992 Martin et al. ....................... 426/631

Primary Examiner—Jeanette Hunter
Attorney, Agent, or Firm—Linn I. Grim

[57] ABSTRACT

Fat (cocoa butter) in a chocolate chip is reduced to below about 10% by using an aqueous sugar paste containing microparticles of cocoa dispersed in the paste. The colloid-like cocoa paste has improved food modifying properties of intense chocolate flavor similar to "conched" chocolate, fat-like mouthfeel, thickener, viscosity control and stability. The hydrated microparticles of cocoa in the paste have a particle size of about 0.1 to about 20 microns, preferably about 0.1 to about 10 microns, and an average mean particle size of about 2 to about 7 microns. The hydrated microparticles of cocoa are dispersed uniformly throughout the aqueous sugar paste. The paste has an Aw (water activity) of about 0.80 to about 0.90.

29 Claims, No Drawings

FOOD MODIFIER AND PROCESS FOR MAKING SAME LOW FAT CHOCOLATY CHIP WITH HYDRATED MICRO PARTICLES OF COCOA

TECHNICAL FIELD

The present invention relates to a low-fat chocolaty chip and, more particularly, to a thermostable low-fat chocolaty chip suitable for making fat-free products such as baked goods, cookies, confections, instant puddings and ice cream. Low-fat chocolaty chip, as defined in this invention, means below ⅓ the level of fat normally found in a traditional chip. Thus, the cocoa butter present in the chocolaty chip of this invention is normally below about 10%, preferably below about 3%, and most preferably below about 2%. Fat-free products, as defined in this invention, means less than ½ gram of fat per serving. This can include chocolaty chips having up to 10% cocoa butter, say 3%, typically 0.1–2% cocoa butter in the chocolaty chip. Additionally, the invention relates to methods of making a low-fat chocolaty chip and incorporating the chocolaty chips into fat-free food products.

DESCRIPTION OF THE PRIOR ART

The food art is replete with disclosures of food modifiers, particularly as substitutes for fat, which disclose small particles of a carbohydrate or protein material which serves to simulate the water-in-oil emulsion properties of a fat or cream.

German Patent Application 2345806 (published Mar. 20, 1975) discloses fine grinding of a bran, such as wheat, corn, rice and barley to a particle size between 0 and 50 microns, preferably 0 to 20 microns, and then using such product as a filler in low calorie foods.

U.S. Pat. Nos. 4,143,174 and 4,209,503 to Shah et al. show colloidal protein particles having an average particle size of less than 10 microns, preferably less than 5 microns, being used as a food modifier for stability, thickening, clouding, gelling and viscosity control purposes.

U.S. Pat. No. 3,023,104 to Battista discloses microcrystalline cellulose at 1 to 300 microns, preferably 1 micron, as a fat substitute. Tiemstra (3,573,058) adds a hydrocolloid, such as sodium alginate to Battista's product to improve its storage stability.

U.S. Pat. No. 4,103,037 to Bodor et al. disclose small particles of protein (below 5 microns) in a low fat spread. In a later patent (4,591,507), Bodor et al. use hydrated starch, from corn, wheat, oats and rice, as a partial fat replacement in margarine to improve the stability and spattering behavior of the margarine. Small particles of hydrated rice starch (8 to 15 microns after swelling) are used for this purpose in margarine.

U.S. Pat. No. 4,305,964 to Moran et al. shows gelled water beads at 5 to 10 microns, preferably coated with a layer of oil, in an artificial cream. Gelled spheres containing hydrocolloid at 10 to 20 microns are shown by Moran et al. (4,305,970), as well as fine fat particles at 0.1 to 2 microns in a dispersed phase of 10 to 40 microns (4,515,825).

U.S. Patent to Finkel (Example 5) shows an imitation chocolate wherein the cocoa butter in the chocolate is replaced with hard butter. This does not produce a low-fat chocolate.

U.S. Pat. No. 4,734,287 to Singer et al. discloses coagulated proteins under heat and shear conditions shaped into spheroidal particles of 0.1 to 2 microns to create the creamy mouthfeel characteristic of fats and oils. This same technique is shown in Singer et al.'s later patent (4,911,946) applied to any carbohydrate (starches, gums, cellulose) to achieve this same creamy mouthfeel.

None of the above patents discloses or suggests the micromilling of cocoa. However, a "Dyno-Mill" sales brochure (published Jun. 1986) by Glen Mills Inc. of Maywood, N.J. discloses that the "Dyno-Mill" machine can be used for extremely fine (0.1 micron) wet milling of various food ingredients. Ingredients such as chocolate sauce, imitation chocolate, nut cream, fat/sugar mixtures, soya flour, coffee, flavoring, etc. are disclosed.

Cocoa can be milled in an aqueous base above 70%, but the micromilled cocoa cannot be used in bakery applications due to its high water content. Bakery products require a moisture content in the micromilled cocoa of below 50%, typically about 25 to 35%. However, at these low water levels the Dyno-Mill does not operate due to seizing of the machine.

Micromilled cocoa has never been used to make a low-fat chocolaty chip. There are no low-fat chips which have good textural, flavor and functional characteristics. The functional attributes necessary for chips in baked goods include the thermal stability to retain distinct shape throughout the heat of baking, and the mechanical stability to remain intact during the dough or batter mixing stage of a product. Making a low-fat chip requires a unique approach to formulation and processing. Cocoa butter is 36% of the formula by weight in a traditional chocolate chip and it functions as an ingredient binder, a structural agent, a flavor carrier, and a textural or mouthfeel agent. The main requirements for confectionery fats are a reasonably hard consistency, stability, and a short melting range just below body temperature. Cocoa butter is the primary fat source found in chocolate, and is defined as the edible fat obtained from cocoa beans. Cocoa butter exhibits a sharp melting point at 98° F., with a softening of the cocoa butter around 90° F. This melt profile of the cocoa butter provides the primary functional role of fat in chocolate, the "melt-in-the-mouth" textural properties. Cocoa butter also contracts upon solidification which allows molding and shaping of chocolate without sticking to the molds.

The cocoa butter in a traditional chocolate chip serves several functions. First, it provides the sensory benefits of a creamy mouthfeel due to the fact that cocoa butter melts sharply at 98° F., at or below body temperature. The fat also carries flavor and allows this flavor to dwell on the taste buds, thereby enhancing the chocolate sensation. In addition to the sensory benefits of fat in chocolate, the fat serves several functional roles in the chocolate piece. The fat binds the cocoa and sugar together to form a paste. It provides the structure of the piece, and it lubricates and contracts to self-extract from the chip molds. Lastly, the cocoa butter, in combination with sugar, provides a fragile but definite structure to the chip during baking so that the chip retains it's shape in the oven. In order to simulate chocolate without using fats, all of the above mentioned benefits must be addressed. However, it should be noted that the legal requirements or standards of identity for chocolate require that the chocolate contain cocoa butter to be called "chocolate". Thus, a fat-free chip with little or no added cocoa butter cannot be labelled or called "chocolate" even though it tastes like chocolate.

Thus, the low-fat chip of this invention will be referred to as a "chocolaty" chip.

It would be desirable if a fat replacer for chocolate chips could be produced having the properties of cocoa butter and chocolate as to fat-like mouthfeel, taste, structure, and "binding" qualities.

It would also be desirable to produce a low-fat chocolaty chip having good textural, flavor and functional characteristics.

It would also be desirable if the low-fat chip had the thermal stability to retain its distinct shape throughout the heat of baking, and the mechanical stability to remain intact during the dough or batter mixing stage for making the food product.

SUMMARY OF THE INVENTION

This invention is founded on the discovery that the fat (cocoa butter) in a chocolate chip can be reduced to below about 10%, preferably below about 3%, and most preferably below about 2%, by using an aqueous sugar paste containing microparticles of cocoa dispersed in the paste. The colloid-like cocoa paste has improved food modifying properties of intense chocolate flavor similar to "conched" chocolate, fat-like mouthfeel, thickener, viscosity control, and stability. The paste comprises hydrated microparticles of cocoa having a particle size of about 0.1 to about 20 microns, preferably about 0.1 to about 10 microns, and an average mean particle size of about 2 to about 7 microns. The hydrated microparticles of cocoa are dispersed uniformly throughout the aqueous sugar paste. The paste has an Aw (water activity) of about 0.80 to about 0.90.

The paste can be made from defatted or partially defatted commercial cocoa powder which has an average particle size of about 75 microns by forming a slurry of about 10% to about 30% (by wt.) cocoa, about 15 to about 75% sugar, and about 20% to about 55% of an aqueous liquid, said sugar and said aqueous liquid being present in the slurry as a 15 to 75% sugar solution, grinding the cocoa particles in the slurry to a particle size wherein 100% of the particles are between about 0.1 to about 20 microns, preferably about 0.1 to about 10 microns, and an average mean particle size of about 2-7 microns thus forming a micromilled cocoa paste.

An acceptable low-fat chocolaty chip can be made simply by combining the cocoa paste with sugar at a sugar:cocoa ratio of between about 2:1 and about 7:1, preferably between about 3:1 and about 4:1, and a total moisture content of between about 10% to about 20%, preferably about 13-17%. The ingredients are then mixed into a dough, the dough is formed into a desired shape, and the shape cut into pieces similar to chocolate chips. Preferably, the paste is combined with sugar which has a small particle size (less than about 100 microns and preferably about 50 microns) for a smooth mouthfeel, and an additional ingredient (about 5-15% dry cocoa powder) for melt stability.

All percentages (%) recited in this specification and claims are by weight.

DETAILED DESCRIPTION OF THE INVENTION

The aqueous paste is characterized by the following particle size distribution for the cocoa particles which are dispersed in the aqueous sugar paste.

| Microns | % By Weight |
| --- | --- |
| <2 | 5-25% |
| <10 | 80-95% |
| >10 <20 | 5-20% |

Typically, less than 20% of the particles are between 10 and 20 microns, less than 25% are between 0.1 and 2 microns, and at least 75% are between 2 and 10 microns.

While the above particle size distribution is effective to give the food-modifying results of this invention, it is preferred that 100% of the cocoa particles be reduced to a size of between about 0.1 and 10 microns. This size gives the best results relative to a mouthfeel which approaches fat-like properties and a "conched" chocolate flavor.

Commercial cocoa powder at an average particle size of above 20 microns and typically 75 microns can be wet-milled in the presence of sugar and an aqueous liquid in a "Dyno-Mill". Any cocoa powder can be used ranging in fat content from about 0.1 to about 26% fat. Preferably, the fat content has been reduced to about 11% or less. The Dyno-Mills are manufactured by Willy A. Bachofen AG and can be obtained in the United States through Glen Mills Inc., 203 Brookdale Street, Maywood, N.J. 07607. The Dyno-Mill grinds the food ingredient in a liquid base (15-75% aqueous sugar syrup) to an extremely fine particle size and disperses the finely ground particles within the liquid medium into a homogenous paste. The aqueous sugar-cocoa slurry to be processed is pumped through a horizontal chamber containing ceramic (zirconium oxide) beads at 1.7 to 2.0 mm. Of course, glass or steel beads can also be used. An agitation shaft with rotor discs moves the beads at great speed impacting them millions of times against the process solids. The shearing forces generated by this action reduce the cocoa solids to between about 0.1 and about 20 microns with 75 to 80% of the cocoa particles between about 2 and about 10 microns. This creates a uniform dispersion of the small particles in the sugar-water paste. The paste is discharged continuously while the beads are retained in the Dyno Mill by a "dynamic separator" which forms an adjustable gap that holds the ceramic beads in the machine while allowing the cocoa paste to exit.

Efforts to wet-mill the cocoa with an aqueous liquid base of 35-65% or roughly below a 1:2 ratio of cocoa-:aqueous liquid met with no success due to seizing of the Dyno-Mill. The strong water absorption characteristics of the cocoa absorb all the water present in the aqueous liquid to form a viscous mass which cannot be ground. This problem can be solved employing sufficient sugar in the aqueous liquid base to have a 15-75% sugar solution. The sugar syrup thus prevents the water from being absorbed by the cocoa during the wet-milling operation and results in a unique paste being produced which has many varied and desired functional properties.

The range of ingredients for forming the slurry which is pumped to the Dyno Mill is about 10% to about 30% for the cocoa, about 15% to about 75% for the sugar and about 20% to about 55% for the aqueous liquid. A preferable range is about 10% to about 20% cocoa, about 50% to about 70% sugar, and about 20% to about 30% aqueous liquid. The most preferred range for making the chocolate chips of this invention is about 10% to about 15% cocoa, about 55% to about 65% sugar and about 25% to about 30% aqueous liquid.

The aqueous liquid may simply be water, but is preferably a protein containing material such as skim milk, low fat milk, or condensed skimmed milk. If fat reduction is not important, whole milk or milk containing fat may be used. Of course, milk solids, such as non-fat milk solids, casein, gelatin, egg whites, or soy protein may be added to the aqueous liquid. Any protein containing material may be added.

The wet-milled paste of sugar, aqueous liquid and micromilled cocoa has truly unexpected functional properties never before observed in an aqueous sugar paste of cocoa particles having a size above 20 microns. The consistency of the paste material is altered drastically so that it has unusual thickening properties. The flavor profile changes unexpectedly to a refined chocolate flavor similar to that achieved by "conching" cocoa with cocoa butter. Unexpectedly, the mouthfeel of the paste is vastly improved giving the perception and sensation of chocolate products which contain a high level of cocoa butter. Moreover, the paste is exceedingly stable to various storage conditions. The paste remains soft (spoonable) under freezer conditions. Ice crystal growth under freezer temperatures is prevented. Crystallization of sugar is inhibited. The paste has increased hydrophobicity and will not dissipate in an aqueous system unless mechanical force is used. If the particles are dispersed in an aqueous system, they will remain suspended and will not settle.

Chocolate chips are normally made from chocolate. Standard recipes call for sugar, chocolate, cocoa butter, milk solids, lecithin, an emulsifier, vanillin and flavors. This standard recipe can be altered by reducing the fat (cocoa butter) and replacing it with the aqueous sugar paste dispersion of micromilled cocoa to make a low-fat chocolaty chip. The dispersion serves not only as the fat replacement but also as the primary flavor carrier and ingredient binder for this chip. Thus, the chocolate, cocoa butter, emulsifier and flavors (natural and artificial) can be eliminated and an excellent low-fat chocolaty chip can be made by combining about 30% to about 50% of the cocoa-sugar paste dispersion with an additional sugar at a level of about 45% to about 55%. The additional sugar is preferably sucrose but other crystalline sugars can be used. Among the suitable crystalline sugars are dextrose, glucose, fructose, lactose and maltose. High fructose corn syrup can also be used with crystalline sugars at a level of up to 20% by weight of the crystalline sugar. The crystalline sugars have their particle size reduced to under about 100 microns, preferably about 50 microns. The small particle size contributes to the desired "melt-in-the-mouth" sensation that traditional chocolate chips provide. Additional dry cocoa powder (defatted to about 11%) having a conventional particle size is also added at about the 5–15% level for melt stability. Total moisture content for the chocolaty chip is about 10–20%. Also important is the sugar:cocoa ratio which should be kept at between about 2:1 and about 7:1, preferably about 3:1 and about 4:1.

In addition, texture and water activity can be manipulated by carefully balancing the ratio of crystalline to non-crystalline sugars. The appropriate ratio will depend on the specific application but ratios for bakery applications will range from about 5:1 to about 15:1. As this crystalline to non-crystalline ratio increases, the chip becomes firmer, shorter, drier and more crumbly.

Another ingredient which can add functionality, if desired, is milk, particularly skim for low-fat applications. The milk reduces cocoa bitterness, giving a more mellow, well-rounded flavor as well as lightening the color slightly and improving shininess.

Hydrocolloids such as gums and starches can also be added either before or after microparticulation to provide various functions in different product applications. In baked systems, hydroxypropylmethylcellulose (Methocel) can be used for melt stability, fibers can be added for non-sugar bulk, gelatin can be added for mouthfeel characteristics, and certain starches can increase viscosity and build structure while maintaining a smooth mouthfeel.

The chocolate-like chocolaty chips are made by simply combining the ingredients, mixing them into a dough and shaping the dough into suitable form which can be cut into pieces similar to chocolate chips. In making the chips, the aqueous sugar dispersion of micromilled cocoa is used at levels varying between about 30% to about 50%.

It should be noted that the low-fat chocolaty chips while having no chocolate (only cocoa powder) provide a strong chocolate-like taste profile similar to "conched" chocolate. Yet, as noted above there is no "conching" of the cocoa powder, milk and sugar used for making the chips. This is a cold process vs a heat process wherein the cocoa powder and excess sugar is mixed, kneaded and allowed to cool and set.

The benefit of the chocolaty chips of this invention over low-fat chocolaty chips made with other fat substitutes is a significantly improved flavor profile as well as a better mouthfeel. Chips made with microparticulated cocoa paste "melt" away quicker and smoother than other low-fat chocolaty chips. These chips are a radical deviation from typical full-fat chocolate chips considering conventional chocolate is about 36% cocoa fat (by weight) and this is reduced to below about 10%, preferably below about 3%, and most preferably about 0.1–2%. When the fat is removed from the system, the primary ingredients in the low-fat chips are low-fat (11%) cocoa powder and sugar. In chocolate, fat functions to bind individual ingredients together, it provides flavor and creates a creamy mouthfeel and mouth coating effect as well as providing structure and thermal stability to the chip. The microparticulated cocoa paste of this invention provides this same functionality. It provides the most important "melt-in-the-mouth" characteristic of a full-fat chocolate chip. It also has an excellent flavor, competitive with full-fat chocolate systems. In addition to binding the ingredients during formation, it provides a slight creamy taste, modest mouth coating and smooth texture in the mouth.

As indicated, the processing of this chip is very simple. Small particle sugar (10X), low fat cocoa powder, and the paste are mixed at a ratio of sugar:cocoa of between about 7:1 and about 2:1, preferably about 3.5:1. The wet and dry ingredients are then blended in a mixer (Hobart) until a lumpy, caked powder is formed. The mixture is then fed into a pasta maker where it is extruded through a die and cut into small pieces with a rotary knife. The die may be of any size and shape desired. The small pieces are then put into a rotary coating reel or panner to round the edges. A coating may be applied in this operation.

A low-fat chocolaty chip can be made by carefully controlling ratios of ingredients such as sugar, cocoa and moisture. The ingredients must be balanced to optimize thermal stability during baking and minimize crumbling throughout the dough mixing stage of cookie production. The functional roles of the fat are addressed by a combination of several factors. The ingredients are held together using moisture in the paste. The ingredients in the paste as well as the sugar provide structure to the chip. The paste contributes mechanical stability in the mixer as well as thermal stability in the oven. In order to achieve that stability, several factors must be controlled.

The ratio of sugar to cocoa is critical for bakery applications. If the sugar level is greater than about 5:1, the chip will melt very quickly in the oven. If the sugar to cocoa level is less than about 2:1, the chip will have very high thermal stability, but a low mechanical stability and will crumble in the mixer. A preferred ratio is between about 3:1 and about 4:1.

In addition to major ingredient ratios, the total moisture content is critical to chip stability, both mechanical and thermal. As the moisture content rises above about 20%, the thermal stability of the chip decreases, melt out occurs, and the chip paste becomes very sticky and difficult to process. As the level drops below about 10%, the mechanical stability of the chip decreases and it becomes crumbly and difficult to form the chip into pieces. A moisture content of about 13-17% is preferred.

The sensory benefits of chocolate, mouthfeel and flavor, are addressed in two different manners. Mouthfeel is simulated via the paste in combination with very small particle sugar. The paste and small particle sugar gives the chip physical structure, and the sugar provides a "melt-in-the-mouth" sensation as the sugar dissolves in the saliva.

This invention will now be described by reference to specific examples.

EXAMPLE 1

An aqueous dispersion was made from the following composition:

| MICROPARTICULARIZED COCOA DISPERSION | |
|---|---|
| Ingredients | % By Weight |
| Cocoa Powder (11% Fat) | 13.0 |
| Sugar | 60.0 |
| Skim Milk | 27.0 |
| TOTAL | 100.00 | the ingredients were thoroughly blended to form an aqueous dispersion of the cocoa in the sugar and skim milk. The dispersion was then ground in a "Dyno-Mill" KD-5 (S.N. 730,711) wet-mill grinder available from Glen Mills Inc. of 203 Brookdale Street, Maywood, N.J. 07607. The cocoa dispersion was pumped through a horizontal grinding chamber filled to 85% capacity with ceramic (zirconium dioxide) beads. Inside the grinding chamber, a rapid rotating shaft (1500 rpm) fitted with specially designed discs drove the beads to rotate at an even more rapid rate. The high shear and impact force of millions of beads pulverized the cocoa particles which were subsequently discharged through a gap or opening in a separator for the beads. The grinding was done at one atmosphere of pressure and a temperature of 50° to 60° C. A uniform and smooth paste with an average mean particle size of between 2 and 7 microns was produced by the Dyno-Mill.

Analysis of the cocoa particles showed a distribution between about 0.1 and about 20 microns with at least 75% of the particles between about 2 and about 10 microns. About 10% of the particles were below 2 microns and about 10% above 10 microns. No particles were above 20 microns. The paste had an Aw of 0.86 making it ideal for addition or combination with bakery products which have an Aw of about 0.75 to about 0.88, preferably about 0.80 to about 0.88.

EXAMPLE 2

NEGATIVE RESULT

When 25 lbs. of the same commercial cocoa used in Example 1 was added to 50 lbs. of skim milk and agitated for 10 minutes and pumped into the Dyno-Mill, no product was obtained due to plugging of the mill. It appeared that the cocoa-skim milk slurry in the Dyno Mill became too thick and viscous to be workable. This is believed to be due to the tremendous water absorption properties of the cocoa particles as they are ground to below 10 microns.

At levels of 25 lbs. cocoa and 75 lbs. skim milk, it was possible to obtain a paste product in the Dyno Mill, but at these levels of water (Aw above 0.9), the paste could not be used in cake and bakery food applications since the moisture level and water activity was too high.

EXAMPLE 3

| | FAT-FREE CHOCOLATE CHIPS | | | | |
|---|---|---|---|---|---|
| Ingredients | % by wt. | % by wt. | % by wt. | % by wt. | % by wt. |
| Confectionery Sugar (10X) | 48.5 | 47.2 | 45.9 | 50.2 | 54.7 |
| Defatted Cocoa Powder | 5.6 | 8.2 | 10.6 | 11.6 | 12.7 |
| Cocoa Dispersion (Ex1) | 45.9 | 44.7 | 43.5 | 38.2 | 32.7 |
| TOTAL | 100% | 100% | 100% | 100% | 100% |

Excellent fat-free chocolaty chips were made using the above formulations. The cocoa dispersion (from Example 1) was simply mixed with the confectionery sugar (sucrose at a particle size of about 50 microns) and additional defatted cocoa powder to form a damp mix or dough. The dough was then extruded in a pasta press into suitable ⅛" to ¼" ribbons which were cut into chocolate chips. These chips had an improved flavor profile and better mouthfeel when compared to fat-free chips made with other fat substitutes. The chocolate chips of this Example "melt away" quicker and smoother than those other fat-free chips. The chocolaty chips are suitable for all fat-free bakery applications, ice cream, dry or ready-to-eat puddings, and confections.

Those skilled in the art will make numerous modifications and variations of this invention as described herein. Consequently, only such limitations as appear in the appended claims should be placed on this invention.

What is claimed is:

1. A low-fat chocolaty chip containing less than about 10% cocoa butter comprising about 30% to about 55% of an aqueous sugar paste of micromilled cocoa and about 45% to about 70% additional sugar; a total sugar to cocoa ratio of between about 2:1 and about 7:1, and a total moisture content of between about 10 and about 20%; said paste comprising about 10 to about 30% cocoa, about 15% to about 75% sugar and about 20% to about 55% aqueous liquid; and said micromilled cocoa having a particle size of about 0.1 to about 20 microns.

2. The chip of claim 1 wherein the micromilled cocoa particles have a particle size of about 0.1 to about 10 microns.

3. The chip of claim 1 wherein the micromilled cocoa particles have an average mean particle size of about 2 to about 7 microns.

4. The chip of claim 1 wherein the cocoa butter is less than about 3%, the total sugar:cocoa ratio is between about 3:1 and about 4:1 and total moisture content is about 13% to about 17%.

5. The chip of claim 1 wherein the aqueous liquid in the paste contains about 1% to about 10% non-fat milk solids.

6. The chip of claim 1 wherein the aqueous sugar paste of micromilled cocoa contains about 1% to about 5% non-fat milk solids, about 10% to about 20% cocoa, about 50% to about 70% sugar, and about 20% to about 30% aqueous liquid.

7. The chip of claim 1 wherein the aqueous sugar paste of micromilled cocoa contains about 10% to about 15% cocoa, about 55 to about 65% sugar, and about 25% to about 30% skim milk.

8. The chip of claim 1 wherein the cocoa butter is about 0.1-2%, and the about 45-70% additional sugar is sucrose having a particle size of about 50 microns.

9. A low-fat chocolaty chip containing less than about 10% cocoa butter wherein the fat normally present in said chip is replaced with an aqueous sugar paste of micromilled cocoa, said chip comprising about 30% to about 45% of said paste, about 45% to about 55% additional sugar having a particle size below 100 microns, and about 5% to about 13% additional unmilled cocoa powder; a total sugar to cocoa ratio of between about 2:1 and about 7:1, and a total moisture content of between about 10 and about 20%; said paste comprising about 10% to about 15% cocoa, about 55% to about 65% sugar, and about 25 to about 30% skim milk; and said micromilled cocoa in said paste having a particle size of about 0.1 to about 20 microns.

10. The chip of claim 9 wherein the micromilled cocoa particles have a particle size of about 0.1 to about 10 microns.

11. The chip of claim 9 wherein the micromilled cocoa particles have an average mean particle size of about 2 to about 7 microns.

12. The chip of claim 9 wherein the cocoa butter is less than about 3% and the total sugar:cocoa ratio is between about 3:1 and about 4:1 and the total moisture content is about 13 to about 17%.

13. The chip of claim 9 wherein the cocoa butter is about 0.1-2% and the about 45-55% additional sugar is sucrose having a particle size of about 50 microns.

14. A fat-free food product containing the chip of claim 9.

15. A process for making a fat-free chocolaty chip containing less than about 10% cocoa butter which comprises:
forming a slurry of about 10% to about 30% hydrated cocoa particles, about 15% to about 75% sugar, and about 20% to about 55% aqueous liquid,
grinding the hydrated cocoa particles in the slurry to a particle size of between about 0.1 and about 20 microns to thereby form an aqueous sugar paste of micromilled cocoa,
mixing about 30% to about 55% by weight of said paste with about 45% to about 70% additional sugar having a particle size of below 100 microns while maintaining a sugar:cocoa ratio of between about 2:1 and about 7:1 and a total moisture content of about 10% to about 20%, to form a dough,
forming the dough into a suitable shape, and
cutting the shape into pieces.

16. The process of claim 15 wherein the micromilled cocoa particles have a particle size of about 0.1 to about 10 microns.

17. The process of claim 15 wherein the micromilled cocoa particles have an average mean particle size of about 2 to about 7 microns.

18. The process of claim 15 wherein the cocoa butter is less than about 3%, the total sugar:cocoa ratio in the mixing step is between about 3:1 and about 4:1 and the total moisture of the dough is about 13 to about 17%.

19. The process of claim 15 wherein the aqueous liquid in the paste contains about 1% to about 10% non-fat milk solids.

20. The process of claim 14 wherein the aqueous sugar paste of micromilled cocoa contains about 1% to about 5% non-fat milk solids, about 10% to about 20 cocoa, about 50% to about 70% sugar, and about 20% to about 30% aqueous liquid.

21. The process of claim 15 wherein the aqueous sugar paste of micromilled cocoa contains about 10% to about 15% cocoa, about 55% to about 65% sugar, and about 25% to about 30% skim milk.

22. The process of claim 15 wherein the cocoa butter is about 0.1-2%, and the about 45-70% additional sugar is sucrose having a particle size of about 50 microns, and the dough is extruded into ribbons of between about ⅛" to about ¼" prior to cutting the ribbons into pieces similar to chocolate chips.

23. A process for making a low-fat chocolaty chip containing less than about 10% cocoa butter which comprises:
forming a slurry of about 10% to about 30% hydrated cocoa particles, about 15% to about 75% sugar, and about 20% to about 55% skim milk,
grinding the hydrated cocoa particles in the slurry to a particle size of between about 0.1 and about 20 microns to thereby form an aqueous sugar paste of micromilled cocoa,
mixing about 30% to about 45% of said paste with about 45 to about 55% additional sugar, and about 5% to about 13% additional unmilled cocoa powder to form a dough having a sugar:cocoa ratio of between about 2:1 and about 7:1 and a total moisture content of about 10% to about 20%,
forming the dough into a suitable shape, and
cutting the shape into pieces similar to chocolate chips.

24. The process of claim 23 wherein the micromilled cocoa particles have a particle size of about 0.1 to about 10 microns.

25. The process of claim 23 wherein the micromilled cocoa particles have an average mean particle size of about 2 to about 7 microns.

26. The process of claim 23 wherein the cocoa butter is less than about 3%, the total sugar:cocoa ratio in the mixing step is between about 3:1 and about 4:1 and the total moisture content of the dough is about 13 to about 17%.

27. The process of claim 23 wherein the aqueous sugar paste of micromilled cocoa contains about 10% to about 15% cocoa, about 55% to about 65% sugar, and about 25% to about 30% skim milk.

28. The process of claim 23 wherein the cocoa butter is about 0.1–2% and about 45% to about 55% of the additional sugar is sucrose having a particle size of about 50 microns, and the dough is extruded into ribbons of between about ⅛" to about ¼" prior to cutting the ribbons into pieces similar to chocolate chips.

29. The process of claim 23 wherein the low-fat chip is incorporated in a food to produce a fat-free food product.

* * * * *